(12) United States Patent
Kim (10) Patent No.: US 12,377,836 B2
(45) Date of Patent: Aug. 5, 2025

(54) METHOD AND APPARATUS FOR PROVIDING ROUTE GUIDANCE

(71) Applicants: HYUNDAI MOTOR COMPANY, Seoul (KR); KIA CORPORATION, Seoul (KR)

(72) Inventor: Jang Shin Kim, Gunpo-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 351 days.

(21) Appl. No.: 17/980,763

(22) Filed: Nov. 4, 2022

(65) Prior Publication Data

US 2023/0234561 A1 Jul. 27, 2023

(30) Foreign Application Priority Data

Jan. 21, 2022 (KR) ........................ 10-2022-0009070

(51) Int. Cl.
*B60W 30/06* (2006.01)
*B60W 60/00* (2020.01)
(Continued)

(52) U.S. Cl.
CPC .......... *B60W 30/06* (2013.01); *B60W 60/001* (2020.02); *G01C 21/3685* (2013.01);
(Continued)

(58) Field of Classification Search
CPC ............... B60W 30/06; B60W 60/001; B60W 2710/20; B60W 2720/10; B62D 15/0285; G01C 21/206; G01C 21/34; G01C 21/3685; G06Q 10/02; G06Q 10/047; G06Q 10/06; G06Q 20/127; G06Q 20/145; G06Q 30/0284; G06Q 50/40; G06Q 90/20; G06Q 2240/00; G06V 20/586; G06V 20/62;
(Continued)

(56) References Cited

U.S. PATENT DOCUMENTS

2013/0265174 A1* 10/2013 Scofield ................. G08G 1/146
340/932.2
2013/0268187 A1* 10/2013 Scofield ............. G01C 21/3685
701/400

(Continued)

*Primary Examiner* — Peter D Nolan
*Assistant Examiner* — Ce Li Li
(74) *Attorney, Agent, or Firm* — Lempia Summerfield Katz LLC (57) ABSTRACT

A route guidance apparatus includes: a reservation information communications unit to receive reservation information which includes at least one of a parking-reserved space of the parking lot, a vehicle type, a vehicle number, and a parking time; a reserved vehicle recognition unit to recognize a vehicle number of a reserved vehicle and determine whether the reserved vehicle enters or exits the parking lot; a traffic flow determination unit that divides an area of each floor of the parking lot into a plurality of unit areas and calculates density within the parking lot based on the number of vehicles within each divided unit area; and a parking route generation unit and an exit route generation unit that respectively generate an optimal parking route and an optimal exit route based on the calculated density; and a route guidance unit to provide the user with the generated optimal parking and exit routes.

10 Claims, 4 Drawing Sheets

(51) Int. Cl.
  *G01C 21/36* (2006.01)
  *G06Q 10/02* (2012.01)
  *G07C 9/00* (2020.01)
  *G08G 1/14* (2006.01)

(52) U.S. Cl.
  CPC ......... *G06Q 10/02* (2013.01); *G07C 9/00182* (2013.01); *G08G 1/141* (2013.01); *G08G 1/146* (2013.01); *B60W 2710/20* (2013.01); *B60W 2720/10* (2013.01); *G06Q 2240/00* (2013.01)

(58) Field of Classification Search
  CPC ............. G07C 9/00182; G08G 1/0175; G08G 1/096827; G08G 1/096838; G08G 1/141; G08G 1/143; G08G 1/144; G08G 1/146; G08G 1/148; G08G 1/149
  See application file for complete search history.

(56) References Cited

U.S. PATENT DOCUMENTS

| | | | |
|---|---|---|---|
| 2018/0052860 A1* | 2/2018 | Hayes | G06Q 50/40 |
| 2020/0273338 A1* | 8/2020 | Srebnogur | G08G 1/147 |
| 2021/0074159 A1* | 3/2021 | Seo | G06T 19/20 |
| 2021/0300340 A1* | 9/2021 | Noguchi | G08G 1/017 |
| 2021/0365894 A1* | 11/2021 | Ma | G07C 9/215 |
| 2022/0013013 A1* | 1/2022 | Chen | G07C 9/00309 |
| 2022/0292971 A1* | 9/2022 | Park | G06V 20/586 |
| 2023/0135554 A1* | 5/2023 | Beaurepaire | G01C 21/3415 701/411 |

\* cited by examiner

METHOD AND APPARATUS FOR PROVIDING ROUTE GUIDANCE

CROSS-REFERENCE TO RELATED APPLICATION

This application claims priority to and the benefit of Korean Patent Application No. 10-2022-0009070, filed on Jan. 21, 2022, the entire contents of which are incorporated herein by reference.

TECHNICAL FIELD

The present disclosure relates to a route guidance apparatus and method.

BACKGROUND

The statements in this section merely provide background information related to the present disclosure and may not constitute prior art.

Contents described in this part merely provide background information of the present disclosure and do not constitute a conventional technology.

A route guidance technology has been developed to provide a route on which a vehicle moves from a real-time location to a destination by using a GPS apparatus. In the route guidance technology, a real-time location of a vehicle is calculated based on the exchange of signals between a communication device mounted on the vehicle and GPS satellites. The communication device used in the route guidance technology includes a smartphone, a tablet computer, etc. in addition to a navigation device.

There is a technology by which a parking space of a parking lot can be reserved online. A user may reserve and schedule a parking lot, a floor number of the parking lot, a parking space, a parking time, etc. by using the Internet, an application, etc. This technology may provide route guidance by being fused with the aforementioned route guidance apparatus so that a vehicle can move to a reserved parking space within a parking lot.

A conventional route guidance apparatus performs route guidance on plane coordinates from a real-time location of a vehicle to a destination, and does take into consideration the number of floors and an internal structure of a parking lot. We have discovered that the conventional technology has a problem in that it cannot accurately provide a driver with route guidance based on a reserved parking space.

Furthermore, the conventional route guidance apparatus guides the shortest route from a real-time location of a vehicle to a parking-reserved space. If a driver is provided with the shortest route without considering the number of vehicles within a parking lot, there is a problem in that traffic congestion may occur within the parking lot.

SUMMARY

According to an embodiment of the present disclosure, a route guidance apparatus comprises: a reservation information communications unit configured to receive, from a communication device of a parking lot, reservation information comprising one or more of a parking-reserved space of the parking lot reserved by a user, a vehicle type, a vehicle number, and a parking time and transmit the reservation information to a communication terminal of the user; a reserved vehicle recognition unit configured to recognize whether a vehicle number of a reserved vehicle by using a camera at an entrance of the parking lot and determine whether the reserved vehicle enters the parking lot or exits from the parking lot. The route guidance apparatus further includes: a traffic flow determination unit that divides an area of each floor of the parking lot into a plurality of unit areas based on a preset unit area, receives a location of a vehicle within the parking lot, and calculates density within the parking lot based on the number of vehicles within each divided unit area of the divided plurality of unit areas. The route guidance apparatus further includes: a parking route generation unit configured to generate an optimal parking route comprising a maximum number of a unit area whose density is determined to be low based on the calculated density; an exit route generation unit configured to generate an optimal exit route comprising a maximum number of a unit area whose density is determined to be low based on the calculated density; and a route guidance unit configured to provide the user with a route generated by the parking route generation unit when the reserved vehicle parks and a route generated by the exit route generation unit when the reserved vehicle exits the parking lot.

According to another embodiment, a route guidance method comprises: receiving, from a communication device of a parking lot, reservation information comprising one or more of a parking-reserved space of the parking lot reserved by a user, a vehicle type, a vehicle number, and a parking time and transmitting the reservation information to a communication terminal of the user; and recognizing a vehicle number of a reserved vehicle by using a camera at an entrance of the parking lot and recognizing whether the reserved vehicle enters the parking lot or exits from the parking lot. The route guidance method further includes: dividing an area of each floor of the parking lot in plural based on a unit area, receiving a location of a vehicle within the parking lot, and calculating density within the parking lot based on the number of vehicles within each divided unit area; generating an optimal parking route comprising a maximum number of a unit area whose density is determined to be low based on the calculated density; generating an optimal exit route comprising a maximum number of a unit area whose density is determined to be low based on the calculated density; and providing the user with a route generated in the process of generating the optimal parking route when the reserved vehicle parks and a route generated in the process of generating the optimal exit route when the reserved vehicle exits the parking lot.

BRIEF DESCRIPTION OF THE DRAWINGS

In order that the disclosure may be well understood, there will now be described various forms thereof, given by way of example, reference being made to the accompanying drawings, in which.

DETAILED DESCRIPTION

The following description is merely exemplary in nature and is not intended to limit the present disclosure, application, or uses. It should be understood that throughout the drawings, corresponding reference numerals indicate like or corresponding parts and features.

When a component, device, element, or the like of the present disclosure is described as having a purpose or performing an operation, function, or the like, the component, device, or element should be considered herein as being "configured to" meet that purpose or to perform that operation or function.

According to an embodiment, a route guidance apparatus may provide a driver with an optimum parking route and an exit route by taking into consideration an internal structure of a parking lot.

The route guidance apparatus may receive a location of a vehicle within a parking lot, may divide the area of each floor of the parking lot into unit areas, and may calculate density for each divided section.

The issues to be solved by the present disclosure are not limited to the aforementioned objects, and the other objects not described above may be evidently understood from the following description by those skilled in the art.

Hereinafter, some embodiments of the present disclosure are described in detail with reference to the accompanying drawings. In the following description, like reference numerals preferably designate like elements, although the elements are shown in different drawings. Further, in the following description of some embodiments, a detailed description of related known components and functions when considered to obscure the subject of the present disclosure is omitted for the purpose of clarity and for brevity.

In describing the components of the embodiments, alphanumeric codes may be used such as first, second, i), ii), a), b), etc., solely for the purpose of differentiating one component from others but not to imply or suggest the substances, the order, or sequence of the components. Throughout this specification, when parts "include" or "comprise" a component, they are meant to further include other components, not to exclude thereof unless there is a particular description contrary thereto.

Figure 1:
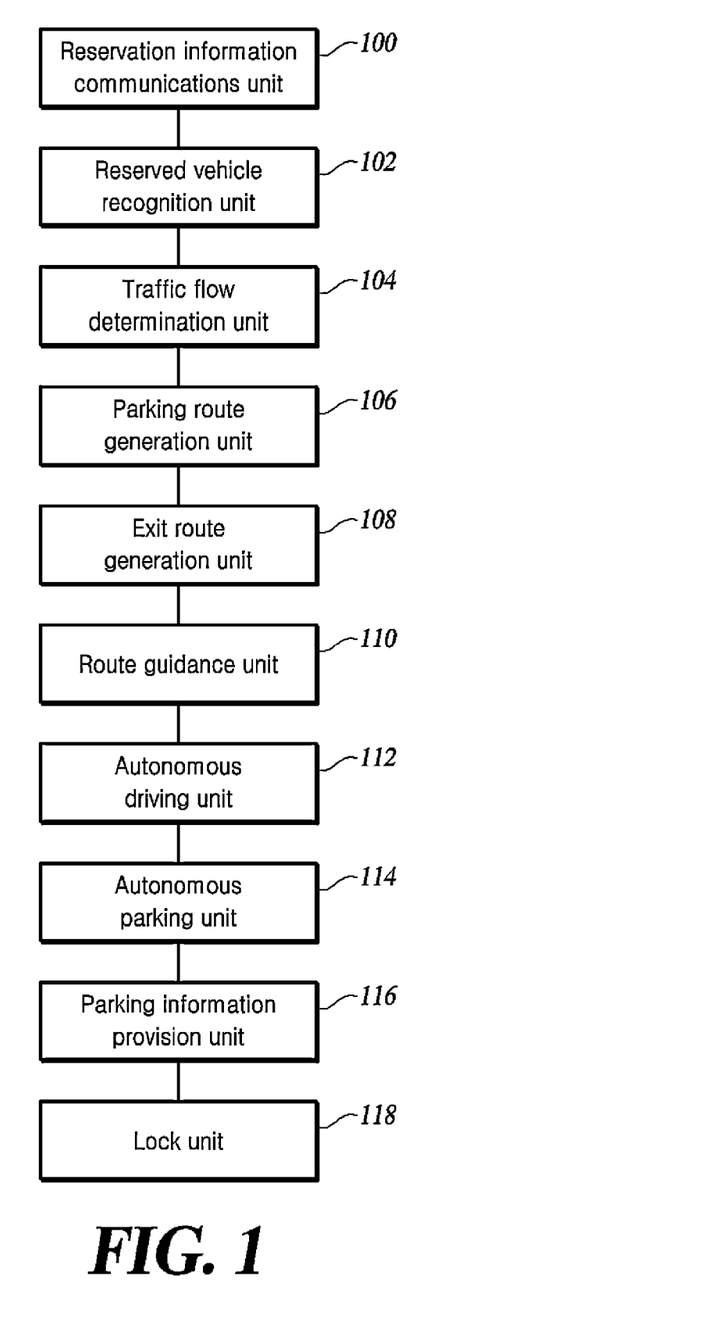
FIG. 1 is a block diagram of a route guidance apparatus according to an embodiment of the present disclosure.

FIG. 1 is a block diagram of a route guidance apparatus according to an embodiment of the present disclosure.

Referring to FIG. 1, the route guidance apparatus includes some or all of a reservation information communications unit 100, a reserved vehicle recognition unit 102, a traffic flow determination unit 104, a parking route generation unit 106, an exit route generation unit 108, a route guidance unit 110, an autonomous driving unit 112, an autonomous parking unit 114, a parking information provision unit 116, and a lock unit 118.

The reservation information communications unit 100 receives, from a communication device of a parking lot, reservation information comprising one or more of a parking-reserved space of the parking lot reserved by a user, a vehicle type, a vehicle number, and a parking time. The communication device of the parking lot is an apparatus for receiving reservation information of a user based on a parking lot reservation application, etc. The reservation information communications unit 100 transmits the received reservation information to a communication terminal of the user.

The reserved vehicle recognition unit 102 recognizes a vehicle within a preset distance from the entrance of a parking lot by using a camera. When the vehicle enters the parking lot or exits from the parking lot, the reservation vehicle recognition unit 102 recognizes a vehicle number by using a camera.

The traffic flow determination unit 104 receives a location of a vehicle within a parking lot. In the case of an already parked vehicle, the traffic flow determination unit 104 receives the final location where the vehicle has parked. The traffic flow determination unit 104 calculates density based on the received location. The density means the number of vehicles present in each of unit areas which are obtained by dividing the area of each floor of the parking lot into a plurality of unit areas. The size of each unit area may be randomly set. The density may be classified into smoothness, congestion, etc. based on a dense degree. Smoothness means low density. In low density, the vehicle can drive smoothly. For example, if the area of a lower ground floor one of a parking lot is 500 $m^2$ and the area of the lower ground floor one is divided into unit areas each being 100 $m^2$, the areas may be denoted as a first area, a second area, a third area, a fourth area, and a fifth area. If the number of vehicles within the first area is 10, the traffic flow determination unit 104 may determine that the density of the first area is congestion. If the number of vehicles within the second area is 2, the traffic flow determination unit 104 may determine that the density of the second area is smoothness.

The parking route generation unit 106 may generate an optimal parking route based on the calculated or classified density. The optimal parking route is a route on which a reserved vehicle moves from a real-time location of the reserved vehicle to a parking-reserved space, and may be generated to include a unit area whose density is determined as smoothness as much as possible.

If the parking route generation unit 106 does not generate an optimal parking route, the parking route generation unit 106 may generate the shortest parking route on which a reserved vehicle moves to a parking-reserved space. The shortest parking route means the shortest distance from a real-time location of the reserved vehicle to the parking-reserved space. A case where the parking route generation unit 106 does not generate an optimal parking route is a case where a unit area whose density is determined as smoothness in order to move to a parking-reserved space is not included by a preset ratio. In this case, the preset ratio may be randomly set by a settlor.

The exit route generation unit 108 may generate an optimal exit route based on calculated density. The optimal exit route is a route on which a vehicle moves from a real-time location of the vehicle to the entrance of a parking lot, and is generated to include a unit area whose density is determined as smoothness as much as possible.

If an optimal exit route cannot be generated, the exit route generation unit 108 may generate the shortest exit route on which a reserved vehicle moves up to the entrance of a parking lot. A case where the exit route generation unit 108 cannot generate an optimal exit route is a case where a unit area determined as smoothness in order to move the entrance of a parking lot is not included by a preset ratio. In this case, the preset ratio may be randomly set by a settlor.

The route guidance unit 110 provides a driver with an optimal parking route, the shortest parking route, an optimal exit route or an optimal exit route generated by the parking route generation unit 106 or the exit route generation unit 108. The route guidance unit 110 provides a driver with a speed, a steering angle, etc. of a vehicle for moving up to a generated route. The route guidance unit 110 guides a driver to a route by using a visual output and/or an auditory output.

A visual output device includes a center infotainment display (CID), a cluster, rear seat entertainment (RSE), a head up display (HUD), etc. The CID provides vehicle driving information and entertainment by performing communication with a navigation device, a mobile, and an audio system. The cluster provides information necessary for driving, such as a driving speed, RPM, fuel quantity, collision warning, etc. of the vehicle. The RSE is a display chiefly used for entertainment activities for a passenger at the backseat of the vehicle, and also provides a driving state of the vehicle or navigation device information. The HUD provides, as a graphic image, a current speed and remaining fuel quantity of the vehicle, and navigation device information by projecting the current speed, the remaining fuel quantity, and navigation device information onto glass in front of the driver. However, the display is not limited thereto, and may include any device capable of providing visual information to a driver or a passenger. An auditory output device includes an audio, an acoustic device, etc. of a vehicle.

If a reserved vehicle is an autonomous vehicle, the autonomous driving unit 112 may control a speed and steering angle of the reserved vehicle based on a route generated by the parking route generation unit so that the reserved vehicle moves up to a parking-reserved space. The autonomous driving unit 112 may control the speed and steering angle of the reserved vehicle so that the reserved vehicle moves up to the entrance of a parking lot based on the route generated by the exit route generation unit. A technology for performing autonomous driving includes a level 0 to a level 5 based on an autonomous driving level. As the number of the level is increased, a vehicle autonomously drives. In the level 0, a driver directly drives a vehicle. In the level 5, a system of a vehicle autonomously drives in the state in which the intervention of a driver has been completely excluded.

If a reserved vehicle is an autonomous vehicle, the autonomous parking unit 114 may control a speed and steering angle of the reserved vehicle so that the reserved vehicle performs autonomous parking in a parking-reserved space. A technology for performing autonomous parking includes remote smart parking assist (RSRP), an automated valet parking system (AVPS), etc. In the RSRP, when a driver presses an operation button of a smart key in the state in which the driver has gotten off a vehicle, the vehicle autonomously parks in a parking space. In the AVPS, a vehicle autonomously searches for a parking space and parks without the intervention of a driver.

If a vehicle has parked, the parking information provision unit 116 generates information ("parking information") including one or more of a map of a parking lot, a location where parking has been completed, and an entrance. The parking information provision unit 116 transmits the generated parking information to a communication terminal of a user.

When a reserved vehicle is present within a preset distance from a parking-reserved space, the lock unit 118 recognizes a vehicle number of the reserved vehicle by using a camera and thus identifies the reserved vehicle. When the recognized vehicle number matches with a vehicle number of the reserved vehicle, the lock unit 118 unlocks a lock. When the reserved vehicle exits from the parking-reserved space, the lock unit 118 recognizes a process of the reserved vehicle performing the exit by using a camera. When the reserved vehicle deviates from the parking-reserved space by a preset distance, the lock unit 118 locks the lock.

Figure 2:
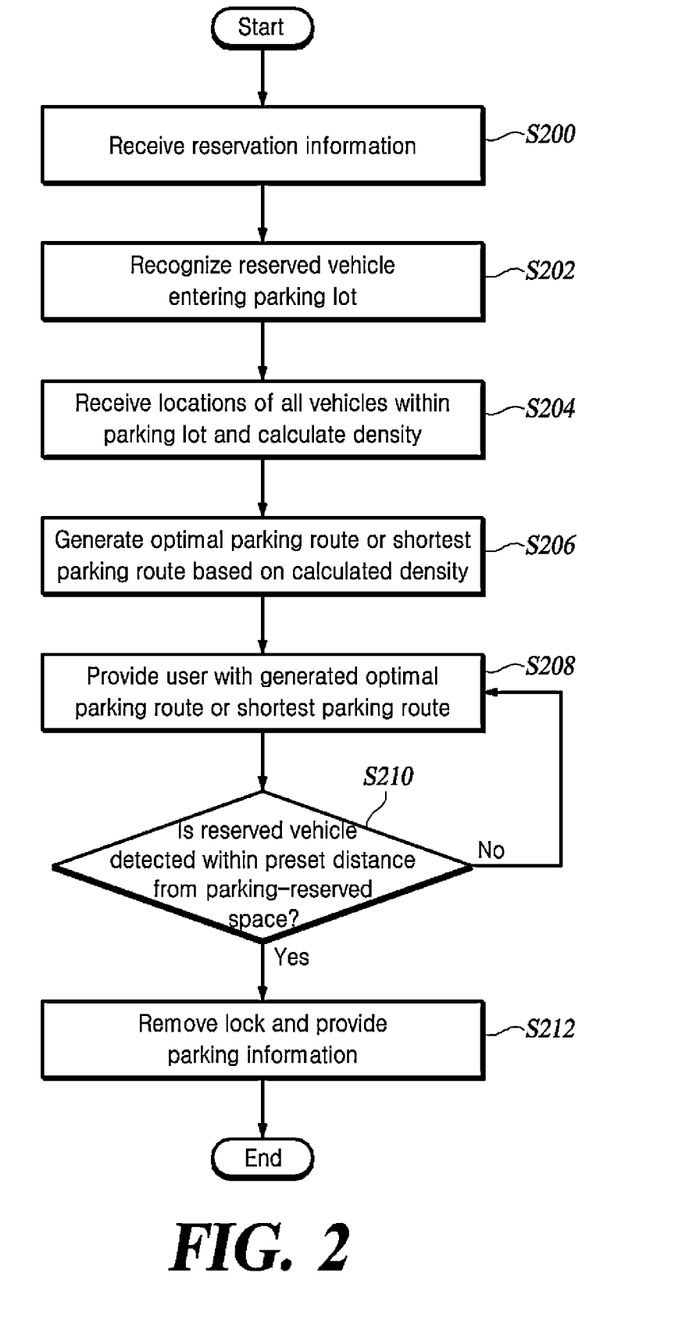
FIG. 2 is a flowchart of process of providing a parking route, by the route guidance apparatus according to an embodiment of the present disclosure.

FIG. 2 is a flowchart of process of providing a parking route, by the route guidance apparatus according to an embodiment of the present disclosure.

Referring to FIG. 2, the reservation information communications unit 100 receives reservation information from a communication device of a parking lot and transmits the reservation information to a communication terminal of a user (S200).

The reservation vehicle recognition unit 102 recognizes a vehicle number of a reserved vehicle by using a recognition device at the entrance of the parking lot (S202).

The traffic flow determination unit 104 divides the area of each floor of the parking lot in plural based on a unit area. The traffic flow determination unit 104 receives locations of all vehicles within the divided unit areas, and calculates the density of each unit area based on the received locations (S204).

The parking route generation unit 106 generates an optimal parking route based on the calculated density. If the parking route generation unit 106 does not generate an optimal parking route, the parking route generation unit 106 generates the shortest parking route (S206).

The route guidance unit 110 provides the user with an optimal parking route or the shortest parking route (S208).

The lock unit 118 determines whether a vehicle is detected to be present within a preset distance from a parking-reserved space by using a camera (S210). If the vehicle is not present within the preset distance from the parking-reserved space, the process returns to step S208.

If the vehicle detected at step S210 is the reserved vehicle, the lock unit unlocks a lock. If the reserved vehicle has parked, the parking information provision unit transmits parking information to the communication terminal of the user (S212).

Figure 3:
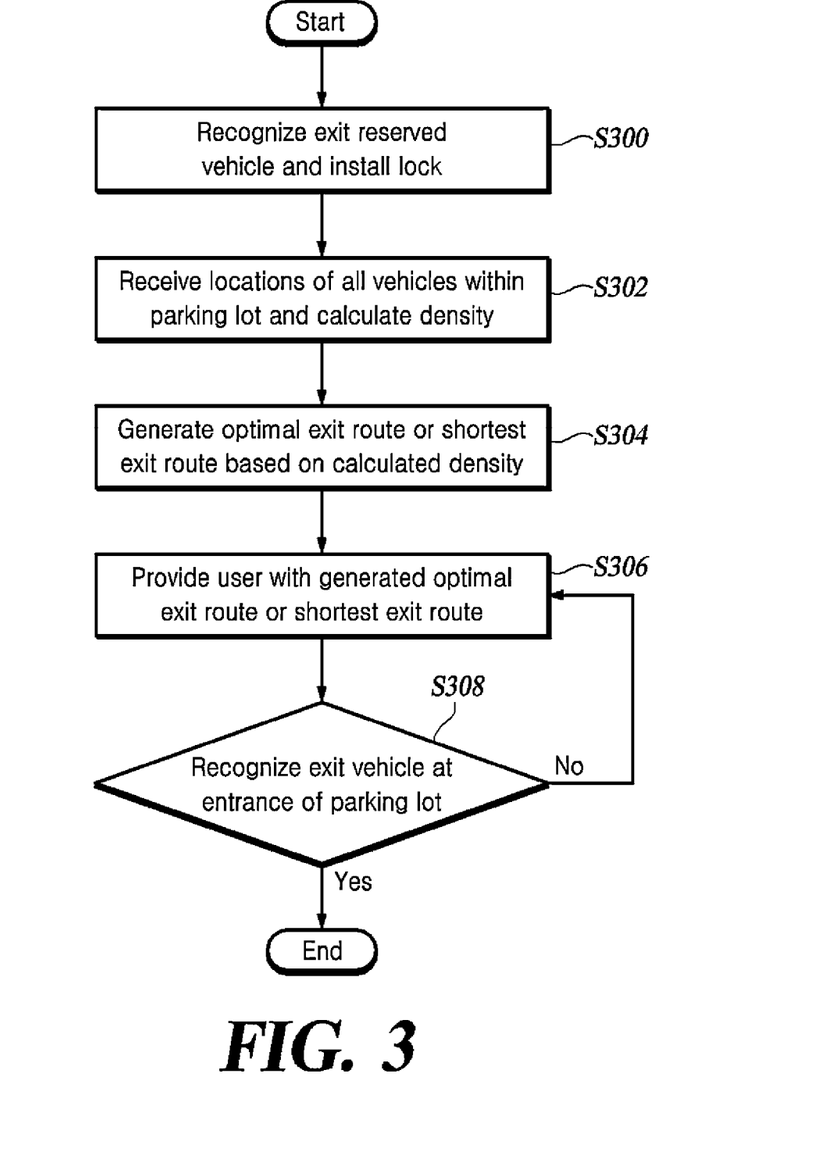
FIG. 3 is a flowchart of process of providing an exit route, by the route guidance apparatus according to an embodiment of the present disclosure.

FIG. 3 is a flowchart of process of providing an exit route by the route guidance apparatus according to an embodiment of the present disclosure.

Referring to FIG. 3, the lock unit 118 recognizes a reserved vehicle that exits from a parking space by using a camera. If it is determined that the reserved vehicle has deviated from a parking-reserved space by a preset distance, the lock unit 118 locks a lock (S300).

The traffic flow determination unit 104 divides the area in plural for each floor of a parking lot based on a unit area. The traffic flow determination unit 104 receives locations of all vehicles within the divided unit areas and calculates the density of each unit area based on the received locations (S302).

The exit route generation unit 108 generates an optimal exit route based on the calculated density. If the exit route generation unit 108 does not generate an optimal exit route, the exit route generation unit 108 generates the shortest exit route (S304).

The route guidance unit 110 provides the user with the optimal exit route or the shortest exit route (S306).

Whether the reserved vehicle is present within a preset distance from the entrance of the parking lot is determined by using a recognition device at the entrance of the parking lot (S308). The reservation vehicle recognition unit 102 recognizes a vehicle number of the reserved vehicle that exits by using the recognition device at the entrance of the parking lot. When the reservation vehicle recognition unit 102 recognizes the reserved vehicle, the route guidance apparatus terminates the route guidance. If the reservation vehicle recognition unit 102 does not recognize the reserved vehicle, the process returns to step S306.

Figure 4:
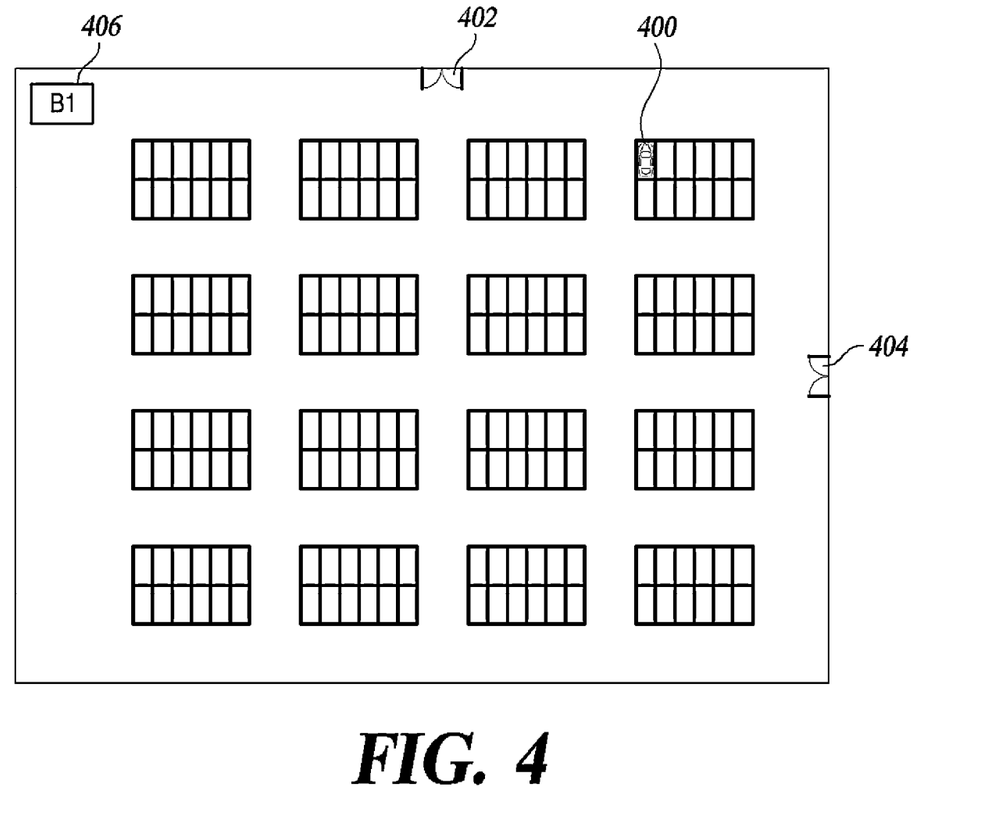
FIG. 4 is an exemplary diagram of parking information provided from the route guidance apparatus according to an embodiment of the present disclosure to a user.

FIG. 4 is an exemplary diagram of parking information provided from the route guidance apparatus to a user according to an embodiment of the present disclosure.

The parking information includes one or more of pieces of information on a location 400 where parking has been completed, entrances 402 and 404, and a floor 406 of a parking lot based on a map of a parking lot. The parking information is generated by the parking information provision unit 116. The parking information provision unit 116 transmits the generated parking information to a communication terminal of a user.

In the flowchart of the present disclosure, the processes have been described as being sequentially executed, but this merely illustrates the technology spirit of some embodiments of the present disclosure. In other words, a person having ordinary knowledge in the art to which some embodiments of the present disclosure pertain may variously modify and change the processes described in the flowchart of the present disclosure by changing and executing the processes or executing one or more of the processes in parallel within a range that does not deviate from the intrinsic characteristic of some embodiments of the present disclosure. Accordingly, the flowchart/flow diagram of the present disclosure is not limited to a time-series sequence.

The various implementation examples of the apparatus and method disclosed in this specification may be implemented by a programmable computer. In this case, the computer includes a programmable processor, a data storage system (including a volatile memory, a nonvolatile memory, or a different type of storage system or a combination of them), and at least one communication interface. For example, a programmable computer may be one of a server, a network device, a settop box, an embedded device, a computer extension module, a personal computer, a laptop, a personal data assistant (PDA), a cloud computing system or a mobile device.

According to an embodiment, the route guidance apparatus can provide a driver with the number of parking floors and a route on which a vehicle moves to a reserved parking space based on information on an internal structure of a parking lot.

According to another embodiment, the route guidance apparatus can generate a moving route, including a unit area whose traffic flow is smooth within a parking lot as much as possible, based on calculated density. Accordingly, all vehicles within a parking lot can smoothly move. Although exemplary embodiments of the present disclosure have been described for illustrative purposes, those having ordinary skill in the art should appreciate that various modifications, additions, and substitutions are possible, without departing from the idea and scope of the present disclosure. Therefore, exemplary embodiments of the present disclosure have been described for the sake of brevity and clarity. The scope of the technical idea of the embodiments of the present disclosure is not limited by the illustrations. Accordingly, one of ordinary skill in the art would understand the scope of the claimed invention is not to be limited by the above explicitly described embodiments but by the claims and equivalents thereof.

REFERENCE NUMERALS

100: Reservation information communications unit
102: Reserved vehicle recognition unit
104: Traffic flow determination unit
106: Parking route generation unit
108: Exit route generation unit
110: Route guidance unit
112: Autonomous driving unit
114: Autonomous parking unit
116: Parking information provision unit
118: Lock unit

What is claimed is:

1. A route guidance apparatus comprising:
at least one memory storing computer-executable instructions; and
at least one processor configured to execute the computer-executable instructions to:
receive, from a communication device of a parking lot, reservation information comprising at least one of a parking-reserved space of the parking lot reserved by a user, a vehicle type, a vehicle number, or a parking time and transmit the reservation information to a communication terminal of the user;
recognize a vehicle number of a reserved vehicle by using a camera at an entrance of the parking lot and determine whether the reserved vehicle enters the parking lot or exits the parking lot;
divide each floor of the parking lot into a plurality of unit areas of a predetermined size;
determine real-time density of each of the plurality of unit areas based on a number of vehicles within the unit area;
generate an optimal parking route comprising a maximum number of a unit area whose density is determined to be low based on the calculated density;
generate an optimal exit route comprising a maximum number of a unit area whose density is determined to be low based on the calculated density;
provide the user with the optimal parking route when the reserved vehicle parks, and provide the user with the optimal exit route when the reserved vehicle exits; and
control a speed and a steering angle of the reserved vehicle based on the optimal parking route or the optimal exit route so that the reserved vehicle moves to the parking-reserved space or exits up to the entrance of the parking lot when the reserved vehicle is an autonomous vehicle.

2. The route guidance apparatus of claim 1, wherein the at least one processor is further configured to control the speed and steering angle of the reserved vehicle so that the reserved vehicle performs autonomous parking in the parking-reserved space.

3. The route guidance apparatus of claim 1, wherein at least one processor is further configured to:
automatically generate parking information comprising at least one of a location where the reserved vehicle is parked, the entrance, or a number of floors of the parking lot based on a map of the parking lot; and
provide the parking information to the user, when the reserved vehicle has parked in the parking-reserved space.

4. The route guidance apparatus of claim 1, wherein at least one processor is further configured to:
recognize the reserved vehicle and unlock a parking lock when the reserved vehicle is within a preset distance from the parking-reserved space; and
recognize the reserved vehicle and lock the parking lock when the reserved vehicle exits from the parking-reserved space.

5. The route guidance apparatus of claim 1, wherein the at least one processor is configured to:
- when generating the optimal parking route based on the density fails, generate a shortest route on which the reserved vehicle moves to the parking-reserved space; and
- when generating the optimal exit route based on the density fails, generate a shortest route on which the reserved vehicle moves to the entrance of the parking lot.

6. A route guidance method comprising:
- receiving, from a communication device of a parking lot, reservation information comprising at least one of a parking-reserved space of the parking lot reserved by a user, a vehicle type, a vehicle number, or a parking time and transmitting the reservation information to a communication terminal of the user;
- recognizing a vehicle number of a reserved vehicle by using a camera at an entrance of the parking lot and recognizing whether the reserved vehicle enters the parking lot or exits from the parking lot;
- dividing each floor of the parking lot into a plurality of unit areas of a predetermined size;
- determining real-time density of each of the plurality of unit areas based on a number of vehicles within the unit area;
- generating an optimal parking route comprising a maximum number of a unit area whose density is determined to be low based on the calculated density;
- generating an optimal exit route comprising a maximum number of a unit area whose density is determined to be low based on the calculated density;
- providing the user with the generated optimal parking route when the reserved vehicle parks and providing the user with the generated optimal exit route when the reserved vehicle exits; and
- controlling a speed and a steering angle of the reserved vehicle based on the generated optimal parking route or the generated optimal exit route so that the reserved vehicle moves to the parking-reserved space or exits up to the entrance of the parking lot when the reserved vehicle is an autonomous vehicle.

7. The route guidance method of claim 6, further comprising: controlling a speed and a steering angle of the reserved vehicle so that the reserved vehicle performs autonomous parking in the parking-reserved space when the reserved vehicle is an autonomous vehicle.

8. The route guidance method of claim 6, further comprising:
- automatically generating parking information comprising at least one of a location where the reserved vehicle is parked, the entrance, or the number of floors of the parking lot based on a map of the parking lot; and
- providing the parking information to the user when the reserved vehicle has parked in the parking-reserved space.

9. The route guidance method of claim 6, further comprising:
- recognizing the reserved vehicle and unlocking a parking lock when the reserved vehicle is within a preset distance from the parking-reserved space, and
- recognizing the reserved vehicle and locking the parking lock when the reserved vehicle exits from the parking-reserved space.

10. The route guidance method of claim 6, wherein:
- when generating the optimal parking route based on the density fails, generating the optimal parking route comprises generating a shortest route on which the reserved vehicle moves to the parking-reserved space, and
- when generating the optimal exit route based on the density fails, generating the optimal exit route comprises generating a shortest route on which the reserved vehicle moves to the entrance of the parking lot.

* * * * *